United States Patent [19]

Sugiyama et al.

[11] Patent Number: 4,780,355

[45] Date of Patent: Oct. 25, 1988

[54] THERMAL TRANSFER INK SHEET

[75] Inventors: Takeo Sugiyama, Takasago; Toshihiko Matsushita, Tokyo; Sadao Morishita, Ushiku, all of Japan

[73] Assignee: Mitsubishi Paper Mills, Ltd., Tokyo, Japan

[21] Appl. No.: 52,405

[22] Filed: May 21, 1987

[30] Foreign Application Priority Data

May 23, 1986 [JP] Japan ................................ 61-119930
Jun. 6, 1986 [JP] Japan ................................ 61-132509

[51] Int. Cl.[4] ................................................ B32B 3/10

[52] U.S. Cl. ................................ 428/195; 428/488.4; 428/913; 428/914

[58] Field of Search ..................... 428/488.4, 195, 211, 428/484, 488.1, 913, 914

[56] References Cited

U.S. PATENT DOCUMENTS 4,615,932 10/1986 Onishi et al. ........................ 428/212
4,698,268 10/1987 Ueyama ........................... 428/488.4

FOREIGN PATENT DOCUMENTS 207752 6/1986 European Pat. Off. ........ 428/195 X

*Primary Examiner*—John E. Kittle
*Assistant Examiner*—P. R. Schwartz
*Attorney, Agent, or Firm*—Cushman, Darby & Cushman

[57] ABSTRACT

A thermal transfer ink sheet comprising a substrate and hot-melt ink layers formed thereon, said hot-melt ink layers having a coefficient of dynamic friction of 0.5 or more based on a soda-lime glass plate can prevent a color shift in superposed printed images on an image receiving sheet.

4 Claims, No Drawings

THERMAL TRANSFER INK SHEET

BACKGROUND OF THE INVENTION

This invention relates to a thermal transfer ink sheet. More particularly, this invention relates to a thermal transfer ink sheet which can prevent inferiority in superposition of colors (or simply "color shift") in color recording by a thermal transfer method.

Recently, thermal transfer recording for forming transferred images on plain paper by using a thermal printer, a thermal facsimile, or the like has been developed. This thermal transfer recording is noticed recently, because maintenance of the apparatus is easy due to simple mechanism, the price and maintenance cost of the apparatus are low, clear and fast recording can be obtained with a low energy, and color recording is relatively easy by using a multi-color ink sheet. In the color recording by using the thermal transfer method, desired multi-colored images are obtained by using hot-melt ink layers of yellow, magenta and cyan, and if necessary black, and melt transferring predetermined images of individual colors to image receiving papers in a predetermined order to superpose the colors. In such a case, colors are formed by single colors of yellow, magenta, cyan, and black, and red from yellow and magenta, green from yellow and cyan, blue from magenta and cyan, and black from yellow, magenta and cyan, depending on the size of heating body of a thermal head.

But there often takes place a color shift due to positional shift of printed images when two or more colors are printed over again in addition to defacement of images (a phenomenon of broadening images due to too low melting point and melt viscosity) and breaking of images (a phenomenon of narrowing images due to too high melting point and melt viscosity or badness in transfer) due to differences in physical properties such as a melting point, a melt viscosity, etc. of inks on ink sheets. In order to remove such a defect, there have been proposed various improvement on printing devices, ink sheets and image receiving sheets.

For example, when a red image is formed from yellow and magenta, the following phenomenon takes place. At the time of melt transfer of a magenta ink layer on a thermal transfer ink sheet, a yellow ink layer on a plain paper, which contacts with the magenta ink layer, also melts by the heat applied to the magenta ink layer and mix melted with the magenta ink layer and sticked so as to superpose the magenta ink on the yellow portion on the plain paper, followed by separation of the plain paper and the thermal transfer ink sheet. In such a case, the plain paper is raised up to the thermal transfer ink sheet side, and the position of the yellow on the plain paper and the transfer position of the magenta are shifted to cause the color shift. In order to solve the problem of color shift, Japanese patent Unexamined publication No. 58-158291 proposes to make melting temperatures of hot-melt ink layers of at least yellow, magenta and cyan formed on a substrate different stepwisely in accordance with the printing order by a thermal head.

But the color shift is not caused only by the difference in the melting points of two inks at the time of melting. Fundamentally, various physical properties between the two inks should be considered in order to solve the problem of color shift.

On the other hand, in order to solve problems of the color shift and inferiority in transfer at the time of printing, Japanese patent Unexamined publication No. 61-14973 proposes a transfer type thermal printer. According to this proposal, the thermal printer is constructed so as to send an ink sheet and a transfer sheet in contact with each other to a separating portion forwardly after the end of transfer at a transfer portion, to separate the two at the separating portion, and to send the transfer sheet backward to the original position after the separation of the two at the separating portion.

In order to conduct color printing without causing the color shift and to improve image quality with an apparatus in smaller in size and faster in printing speed, Japanese patent Unexamine publication No. 61-43871 proposes a color printer wherein a recording paper is fitted on a revolving body and thermal transfer recording is conducted by revolving the revolving body one time every time a printing color is changed.

But even if the printing apparatus are improved as mentioned above, the problem of color shift is not solved sufficiently. In other words, the phenomenon of color shift may be caused by some physical properties between the ink sheet and the image receiving paper and the improvement of the apparatus should be preceded by the improvement of such physical properties.

SUMMARY OF THE INVENTION

It is an object of this invention to provide a thermal transfer ink sheet which does not cause the color shift at the time of superposing colors in a thermal transfer type color recording method.

This invention provides a thermal transfer ink sheet comprising a substrate, hot-melt ink layers of at least yellow, magenta and cyan without overlapping formed on one side of the substrate and a heat resistance-treated layer formed on the other side of the substrate, said ink layers having a coefficient of dynamic friction of 0.5 or more in an average value of any two ink layers and the remainder being 0.5 or more when measured by using a soda-lime glass plate having an average roughness of Ra=0.01 to 0.03 μm.

DESCRIPTION OF THE PREFERRED EMBODIMENTS

The color shift at the time of color superposing printing is explained below. In the case of providing colored images by using ink sheets of three colors of yellow, magenta and cyan, or four colors of yellow, magenta, cyan and black, a color mixture by superposing printing such as red from yellow and magenta, green from yellow and cyan, blue from magenta and cyan and black from yellow, magenta and cyan is necessary. For example, a red color is formed by printing a magneta color precisely on a yellow printed portion. In this case, when a magneta color is printed slightly shifted from the yellow printed portion, there are indentified three kinds of colors, that is, a yellow portion, a red portion, and a magenta portion, as a whole.

This color shift seems to be caused as follows. A yellow ink sheet and an image receiving sheet are in contact with each other and printed by a thermal head, followed by separation of the ink sheet and the image receiving sheet. In this case, a printing apparatus is designed so as to print the magneta precisely on the image receiving paper by keeping the distance from the thermal head portion to a rider roll and capstan roll portion constant. But at the time of printing the yellow, when the coefficient of dynamic friction between the side of ink layer on the ink sheet and the image receiving sheet is too small, the pulling strength at the side of the capstan roll becomes larger and the image receiving sheet is drawn out more than necessitated to make the receiving sheet slack. Then the image receiving sheet is returned to the thermal head side. In the next step, the printing of the magneta is carried out on the slack image receiving sheet. As a result, printing of the magenta on the yellow causes the color shift.

As mentioned above, the color shift is caused when the adhesiveness between the ink layer on the ink sheet and the image receiving sheet is small. In other words, it becomes clear that the color shift is controlled by coefficients of dynamic friction of the ink layer on the ink sheet and the image receiving sheet.

On providing the coefficient of dynamic friction between the ink sheet and the image receiving sheet, the following things are considered. As the image receiving sheet, there can be used various kinds of materials having from low smoothness to high smoothness such as fine paper not coated with pigments and the like, coated paper coated with pigments and the like, plastic films for OHP (Over Head Projector) made from, for example, polyethylene, polypropylene, polyester, and the like. Thus, the coefficient of dynamic friction of the ink layer on the ink sheet is measured by using a typical glass plate, that is, a soda-lime glass plate having an average roughness of Ra=0.01 to 0.03 $\mu$m in place of the image receiving sheet.

In the ink sheet of this invention, when the coefficient of dynamic friction of the ink layers on the ink sheet measured by using the above-mentioned soda-lime glass plate is 0.5 or more, clear superposing printing is possible without causing the color shift. In this case, when each yellow, magenta or cyan ink layer has the coefficient of dynamic friction of 0.5 or more, there is no problem. But when an average value of two ink layers of the three colors of yellow, magenta and cyan is 0.5 or more and the rest of the ink layers has the value of 0.5 or more, such a ink sheet can be used practically. Preferable coefficient of dynamic friction of each ink layer is 0.6 or more, more preferably 0.75 or more.

On the other hand, when the coefficient of dynamic friction of each ink layer when measured by using the soda-lime glass plate mention above is less than 0.5, each ink layer is shifted on the image receiving sheet to cause the color shift.

On the other hand, the heat resistance-treated layer formed on the other side of the ink sheet preferably has a coefficient of dynamic friction of 0.25 or less when measured by using the soda-lime glass plate mentioned above in order to slide smoothly unlike the ink layers, since the heat resistance-treated layer directly contacts with the thermal head and runs while sliding. When the coefficient of dynamic friction is more than 0.25, the frictional resistance to the thermal head becomes so great that the running of the ink sheet becomes difficult.

The heat resistance-treated layer can be formed by using such materials as silicone oils, silicone resins, nitrocellulose, silicone modified acrylic resins, alkoxysilane hydrolyzates, and colloidal fine particles of silica, silicate, alumina and the like. These materials are dissolved or dispersed in water or organic solvents and coated on a substrate using a roll coater, a gravure coater, a flexo coater, or the like.

As the substrate, there can be used a polyester film, a polycarbonate film, a cellulose acetate film, a polypropylene film, a polyethylene film, cellophane, etc.

Sometimes, the color shift problem is not solved sufficiently by using the above-mentioned ink sheet. This is because the color shift is not always caused by one or two physical actions and sometimes the color shift is caused by several physical actions. The color shift problem can be solved by noticing the difference in melting points of individual inks but this cannot be applied to all the cases. For example, when the mechanical frictional resistance between a yellow ink on an image receiving sheet and a magneta ink on a thermal transfer ink sheet is small, the magenta ink slips from the position of yellow ink on the image receiving sheet to cause the color shift at the time of transferring the magenta ink. In such a case, it is better to solve the color shift problem by taking as a physical phenomenon at the time of registration before the melt transfer of ink.

According to this invention, the color shift problem can also be solved by making the coefficient of dynamic friction between an ink layer on an image receiving sheet and a different kind of ink layer on a thermal transfer ink sheet large so as to make slipping of the two different kinds of ink layers smaller. The measurement of the coefficient of dynamic friction between an ink side (or layer) on the image receiving sheet and an ink side (or layer) on the thermal transfer ink sheet is impossible, since different values are obtained depending on the kinds of image receiving sheets and the kinds of thermal transfer printers. Therefore, the evaluation for the superposition of colors is made by measuring the coefficient of dynamic friction between two different kinds of ink sides on the same color thermal transfer ink sheet.

That is, in the color thermal transfer ink sheet produced by forming hot-melt ink layers of three or four different colors without overlapping on the same side of a substrate, when the coefficient of dynamic friction between two different color ink sides is remarkably small such as less than 0.70, an ink to be transferred on the ink (e.g. yellow ink) already transferred to the image receiving sheet slips from the yellow portion to cause the color shift. On the other hand, when the coefficient of dynamic friction is 0.70 or more, there takes place no slipping of an ink to be transferred from the ink (e.g. yellow ink) already transferred to the image receiving sheet, and thus a clear color image can be obtained without causing the color shift.

As mentioned above, the color shift can be prevented by making the coefficients of dynamic friction of individual ink layers of three or four principle colors formed on the same side of the substrate 0.5 or more, and preferably making the coefficient of dynamic friction of the heat resistance-treated layer formed on the other side of the substrate 0.25 or less, the coefficients of dynamic friction being measured by using a soda-lime glass plate having an average roughness of $R_a$=0.01 to 0.03 $\mu$m.

Further, the color shift can also be prevented by additionally making the coefficient of dynamic friction between two different kinds of color ink layers formed on the same side of the substrate in the color thermal transfer ink sheet.

When the above-mentioned two conditions are combined, the effect for preventing the color shift is remarkably enhanced.

This invention is illustrated by way of the following Examples, in which all the percents and the parts are by weight unless otherwise specified.

EXAMPLES 1 TO 5

Hot-melt inks of yellow (Y), magenta (M), cyan (C) and black (BK) were prepared with the formulations as shown in Table 1. As the inks, there were used 9 kinds of inks, i.e., three kinds of Y ink, and each two kinds of M, C and BK inks.

TABLE 1

(%)

| | Color and ink No. | | | | | | | | |
|---|---|---|---|---|---|---|---|---|---|
| | Yellow | | | Magenta | | Cyan | | Black | |
| Materials | Y-1 | Y-2 | Y-3 | M-1 | M-2 | C-1 | C-2 | BK-1 | BK-2 |
| Colorant | 8 | 8 | 8 | 8 | 8 | 6 | 6 | 13 | 13 |
| EVA | 2.5 | 2.5 | 2.5 | 2.5 | 2.5 | 2.5 | 2.5 | 5 | 5 |
| Paraffin wax | 31.5 | 30.5 | 26.5 | 31.3 | 26.3 | 33.3 | 28 | 24 | 23 |
| Oxidized paraffin wax | 20 | 20 | 20 | 20 | 20 | 20 | 20 | 20 | 20 |
| Carnauba wax | 30 | 30 | 30 | 30 | 30 | 30 | 30 | 30 | 30 |
| Petroleum resin | 5 | 5 | 5 | 5 | 5 | 5 | 5 | 5 | 5 |
| Cross-linked polystyrene particles | 0 | 1 | 5 | 0.2 | 5.2 | 0.2 | 5.5 | 0 | 1 |
| Mineral oil | 3 | 3 | 3 | 3 | 3 | 3 | 3 | 3 | 3 |

(Note)
Colorant:
Y = Benzidine Yellow G
M = Permanent Carmine FB
C = Phthalocyanine Blue
BK = Carbon black
EVA: ethylene-vinyl acetate copolymer
Paraffin wax: melting point 66° C.
Oxidized paraffin wax: melting point 67° C.
Petroleum resin: softening point 90° C.

Three kinds of heat resistance-treating agents were prepared as shown in Table 2.

TABLE 2

(%)

| Heat resistance-treating agent | a | b | c |
|---|---|---|---|
| Silicone-modified acrylic resin | 98 | 99 | 100 |
| Friction coefficient regulating agent | 2 | 1 | 0 |

Note
Friction coefficient regulating agent: benzoguanamine resin particles having a particle size of 0.2 μm.

As a substrate, there was used a polyethylene terephthalate film having a thickness of 6 μm. On one side of the substrate, a 10% toluene solution of a heat resistance-treating agent was coated by using a solvent coater at a coverage of 0.3 $g/m^2$ on dry basis.

Then, an opposite side of the substrate was coated with inks of Y, M, C and BK in this order repeatedly without overlapping by using a hot-melt coater so as to make the coating thickness 4 μm to give a thermal transfer ink sheet as shown in Table 3.

TABLE 3

| Example No. | | 1 | 2 | 3 | 4 | 5 |
|---|---|---|---|---|---|---|
| Ink No. | Yellow | Y-1 | Y-2 | Y-3 | Y-1 | Y-1 |
| | Magenta | M-1 | M-1 | M-2 | M-1 | M-1 |
| | Cyan | C-1 | C-1 | C-2 | C-1 | C-1 |
| | Black | BK-1 | BK-1 | BK-2 | BK-1 | BK-1 |
| Heat resistance-treating agent | | a | a | a | b | c |

The coefficient of dynamic friction was measured according to JIS-C 6244 using a Card friction coefficient measuring device manufactured by Toyo Seiki Co., Ltd. Further, printed portions side of a thermal transfer ink sheet was superposed on those of an image receiving sheet for thermal transfer (TTR-T, a trade name, mfd. by Mitsubishi Paper Mills, Ltd.), and the color shift was evaluated by observing one dot (250 μm in diameter) of superposed printed portion by 2 different kinds of colors of yellow and magenta, yellow and cyane, magenta and cyane, and yellow and black using an optical microscope.

The results were shown in Table 4.

TABLE 4

| | | Example No. | | | | |
|---|---|---|---|---|---|---|
| | | 1 | 2 | 3 | 4 | 5 |
| Coefficient of dynamic friction based on soda-lime glass plate | Yellow ink layer | 0.85 | 0.50 | 0.14 | 0.85 | 0.85 |
| | Magenta ink layer | 0.78 | 0.78 | 0.12 | 0.78 | 0.78 |
| | Cyan ink layer | 1.02 | 1.02 | 0.22 | 1.02 | 1.02 |
| | Black ink layer | 0.93 | 0.93 | 0.42 | 0.93 | 0.93 |
| | Heat resistance-treated layer | 0.13 | 0.13 | 0.13 | 0.25 | 0.50 |
| Evaluation of color shift | Yellow/Magenta | O | Δ | X | Δ | X |
| | Yellow/Cyan | O | O | X | Δ | X |
| | Magenta/Cyan | O | O | X | Δ | X |
| | Yellow/Black | O | O | X | Δ | X |
| Overall evaluation | | O | O | X | Δ | X |

Note
O: Almost no color shift.
Δ: Slight color shift but no problem in practical use.
X: Considerable color shift and impossible in practical use.

As is clear from Table 4, when the coefficient of dynamic friction of the ink layers on the thermal transfer ink sheet is made 0.50 or more when measured by using the soda-lime glass plate (average roughness: $R_a$=0.01 to 0.03 μm), and that of the heat resistance-treated layer is made 0.25 or less, almost no color shift is produced (Examples 1 and 2). On the other hand, when the coefficient of dynamic friction of any one of ink layers is less than 0.50 (Example 3) and that of the heat resistance-treated layer is more than 0.25 (Example 5), the color shift takes place and practical use is impossible.

EXAMPLES 6 TO 9

Hot-melt inks were prepared by using the same materials as used in Examples 1 to 5 but changing the formulations as listed in Table 5 and further using as the friction coefficient regulating agent barium stearate and erucylamide.

Using the hot-melt inks listed in Table 6 and the heat resistance treating agent a in Table 2, thermal transfer ink sheets were produced in the same manner as described in Examples 1 to 5.

TABLE 5

| | Yellow (Y) | | | | Magenta (M) | | | Cyan (C) | | | | Black (BK) | | (%) |
|---|---|---|---|---|---|---|---|---|---|---|---|---|---|---|
| | Y-1 | Y-2 | Y-3 | Y-4 | M-1 | M-2 | M-3 | C-1 | C-2 | C-3 | C-4 | BK-1 | BK-2 | BK-3 |
| Colorant | 8 | 8 | 8 | 8 | 8 | 8 | 8 | 6 | 6 | 6 | 6 | 13 | 13 | 13 |
| EVA | 2.5 | 2.5 | 2.5 | 2.5 | 2.5 | 2.5 | 2.5 | 2.5 | 2.5 | 2.5 | 2.5 | 5 | 5 | 5 |
| Wax Paraffin wax | 26.5 | 31.5 | 30.5 | 26.5 | 26.2 | 31.3 | 26.3 | 33.3 | 31.2 | 29.5 | 28 | 24 | 22 | 18 |
| Oxidized paraffin wax | 25 | 20 | 20 | 20 | 25 | 20 | 20 | 20 | 20 | 20 | 20 | 20 | 20 | 20 |
| Carnauba wax | 30 | 30 | 30 | 30 | 30 | 30 | 30 | 30 | 30 | 30 | 30 | 30 | 30 | 30 |
| Petroleum resin | 5 | 5 | 5 | 5 | 5 | 5 | 5 | 5 | 5 | 5 | 5 | 5 | 5 | 5 |
| Friction coefficient regulating agent Cross-linked polystyrene particles | — | — | 1 | 5 | — | 0.2 | 5.2 | 0.2 | 0.4 | — | 5.5 | — | — | — |
| Barium stearate | — | — | — | — | — | — | — | — | — | 4 | — | — | — | 6 |
| Erucylamide | — | — | — | — | 0.3 | — | — | — | — | — | — | — | 2 | — |
| Mineral oil | 3 | 3 | 3 | 3 | 3 | 3 | 3 | 3 | 3 | 3 | 3 | 3 | 3 | 3 |
| Coefficient of dynamic friction based on soda-lime glass plate | 1.55 | 0.85 | 0.50 | 0.14 | 1.63 | 0.78 | 0.12 | 1.02 | 0.98 | 0.51 | 0.22 | 0.93 | 0.60 | 0.25 |

TABLE 6

| Example No. | 6 | 7 | 8 | 9 |
|---|---|---|---|---|
| Yellow | Y-1 | Y-4 | Y-2 | Y-3 |
| Magenta | M-1 | M-3 | M-2 | M-1 |
| Cyan | C-2 | C-4 | C-3 | C-1 |
| Black | BK-2 | BK-3 | BK-1 | BK-2 |

The coefficient of dynamic friction was measured in the same manner as mentioned in Examples 1 to 5 and the color shift was evaluated in the same manner as mentioned in Examples 1 to 5.

The results are shown in Table 7.

TABLE 7

| Example No. | | 6 | 7 | 8 | 9 |
|---|---|---|---|---|---|
| Coefficient of dynamic friction between two ink layers | Yellow/Magenta | >2.5 | 0.14 | 1.24 | 1.12 |
| | Yellow/Cyan | 2.24 | 0.12 | 0.70 | 1.47 |
| | Magenta/Cyan | 2.33 | 0.22 | 0.50 | >2.5 |
| | Yellow/Black | 0.94 | 0.42 | 1.52 | 0.70 |
| Evaluation of color shift | Yellow/Magenta | O | X | O | O |
| | Yellow/Cyan | O | X | O | O |
| | Magenta/Cyan | | X | Δ | |
| | Yellow/Black | O | X | O | O |
| Overall evaluation | | O | X | Δ | O |

As is clear from Table 7, the color shift can be removed by making the coefficient of dynamic friction between two ink layers formed on the same side of the thermal transfer ink sheet 0.70 or more (Examples 6 and 9). In contrast, when the coefficient of dynamic friction between two ink layers is less than 0.70 as in Example 7, the color shift takes place and the practical use is impossible. On the other hand, even if one of the coefficient of dynamic friction between two ink layers is slightly less than 0.70, the color shift is substantially prevented so as to make the practical use possible as shown in Example 8.

What is claimed is:

1. A thermal transfer ink sheet comprising a substrate, hot-melt ink layers of at least yellow, magnenta and cyan without overlapping formed on one side of the substrate and a heat resistance-treated layer formed on the other side of the substrate, said ink layers having a coefficient of dynamic friction of 0.5 or more in an average value of any two ink layers and the remainder being 0.5 or more when measured by using a soda-lime glass plate having an average roughness of Ra=0.01 to 0.03 μm and wherein two different kinds of ink layers have a coefficient of dynamic friction of 0.70 or more.

2. A thermal transfer ink sheet comprising a substrate, hot-melt ink layers of at least yellow, magenta and cyan without overlapping formed on one side of the substrate and a heat resistance-treated layer formed on the other side of the substrate, said ink layers having a coefficient of dynamic friction of 0.5 or more in an average value of any two ink layers and the remainder being 0.5 or more when measured by using a soda-lime glass plate having an average roughness of Ra=0.01 to 0.03 μm, wherein the heat resistance-treated layer has a coefficent of dynamic friction of 0.25 or less when measured by using a soda-lime glass plate having an average roughness of Ra=0.01 to 0.03 μm.

3. A thermal transfer ink sheet comprising a substrate, hot-melt ink layers of at least yellow, magenta and cyan without overlapping formed on one side of the substrate and a heat resistance-treated layer formed on the other side of the substrate, said ink layers having a coefficient of dynamic friction of 0.5 or more in an average value of any two ink layers and the remainder being 0.5 or more when measured by using a soda-lime glass plate having an average roughness of Ra=0.01 to 0.03 μm wherein each of the ink layers has a coefficient of dynamic friction of 0.5 or more when measured by using a soda-lime glass plate having an average roughness of Ra=0.01 to 0.03 μm, two different kinds of ink layers have a coefficient of dynamic friction of 0.70 or more, and the heat resistance-treated layer has a coefficient of dynamic friction of 0.25 or less when measured by using a soda-lime glass plate having an average roughness of Ra=0.01 to 0.03 μm.

4. A thermal transfer ink sheet as in claim 1 or claim 2 or claim 3, wherein the hot-melt ink layers comprises yellow, magenta, cyan and black ink layers.

* * * * *